3,255,128
CELLULAR POLYURETHANE CONTAINING PHOSPHATIZED ALUMINUM FLAKE
Adalbert Farkas, Media, and Harold A. Green, Havertown, Pa., assignors to Air Products and Chemicals, Inc., Philadelphia, Pa., a corporation of Delaware
No Drawing. Filed Nov. 8, 1962, Ser. No. 236,398
3 Claims. (Cl. 260—2.5)

This invention relates to polyurethane foam compositions containing small particles of metallic aluminum and to methods for treating the aluminum particles to enhance their usefulness in polyurethane foam.

Heretofore there have been proposals for the production of polyurethane foams containing small particles of metallic aluminum. In some formulations, the function of the aluminum particle has been to impart metallic characteristics to the organic composition. Aluminum powder has been employed in some polyurethanes to increase the electrical conductivity of the composition. Polyurethane foam containing aluminum particles has generally been prepared from formulations characterized by polyester resins. Moreover, the gas cells generated in the nascent foam generally have resulted from the reaction of water with isocyanato groups. Aluminum particles readily wetted by oil and generally water repellent have been recommended for some of such formulations containing water.

Polyurethane foam has also been prepared by utilizing volatilizable organic liquids such as trichlorofluoromethane to promote the formation of appropriate cells within the foam structure. The volatilizable organic liquid is dissolved and/or dispersed throughout the foam forming composition at a temperature significantly below the boiling point of the liquid, and thereafter the entire composition is heated to a temperature above the boiling point of the volatilizable liquid. It is ordinarily not necessary to apply a large amount of external heat, but only necessary to initiate the polyurethane polymerization reaction, which reaction generates within the reaction mixture sufficient heat to bring about the volatilization of the trifluorochloromethane and the foaming of the composition.

In accordance with the present invention, commercially available aluminum flakes are treated with phosphoric acid to provide phosphatized aluminum flakes, and the phosphatized aluminum flakes are admixed to provide at least 0.5% but less than 5% by weight phosphatized aluminum flakes in a polyurethane composition, said composition being foamed and expanded by the vaporization of a volatilizable liquid, and said polyurethane composition being prepared by the interaction of an organic compound having at least two isocyanate groups and an organic compound having at least two hydroxyl groups.

By reason of the aluminum content, the polyurethane foam has a silvery color and a capacity for reflecting light and heat which is significantly greater than polyurethane foam free from aluminum particles. The ability of the aluminum-containing foam to reflect heat makes it particularly suitable as an insulation in environments wherein there is a large difference in temperature. For example, portable welding torches generate such high temperatures that insulating shields are sometimes provided to protect adjacent areas from the heat and light from the torch. Rigid polyurethane foam insulation panels prepared in accordance with the present invention can be employed as such welding shields. Similarly, flexible foam prepared in accordance with the invention can be employed as insulation having an attractive combination of reflective and nonconductive characteristics when used in welding gloves, rescue armor, and related clothing.

The nature of the invention is further clarified by reference to a plurality of examples.

*Example 1*

A control sample of polyurethane foam is prepared by the interaction of the following formulation:

| | Parts by wt. |
|---|---|
| Resinous polyol resulting from the interaction of propylene oxide and methyl glucoside, said resinous polyol having a hydroxyl number of 460 | 163.6 |
| Moderate viscosity polyol prepared by the interaction of methyl glucoside with approximately 1 mol of propylene oxide per hydroxyl group, said moderate viscosity polyol having a hydroxyl number of 340 | 36.4 |
| Tolylene diisocyanate | 138.0 |
| Surface tension modifier prepared by the interaction of alkylene oxide and precursors for silicones, whereby a polyalkyleneether glycol derivative of a silicone is obtained, which silicone is soluble in both water and in oil | 1.2 |
| Trichlorofluoromethane, a volatilizable organic liquid | 51.6 |
| Triethylenediamine catalyst | 2.0 |

The components of the formulation are thoroughly mixed by hand, and the batch is promptly poured into test molds, in which the composition undergoes a foaming reaction to prepare a highly satisfactory polyurethane foam product.

Several polyurethane insulation panels utilizing said formulation and modified sufficiently to provide in the finished product a quantity of aluminum powder corresponding to approximately 1% of the foam composition were prepared. In certain control procedures, it was established that commercially available aluminum flake, such as employed in aluminum paints, is a powerful collapsing agent, so that the nascent foam from formulations containing even small amounts (e.g., 0.5% by weight) of such aluminum flake, collapse instead of developing into strong low density foam products. All attempts at preparing polyurethane foams utilizing the previously discussed formulation for the organic components, and modified by the admixture of approximately 1% aluminum flake in each of the polyols and diisocyanate resulted in a collapse of the foam prior to attaining the expected maximum height. A hypothesis was proposed that the commercially available flake had a surface coating which stimulated the collapse. A variety of attempts were made to remove from the commercially available flake aluminum whatever active coating was present. It was thus established that subjecting the aluminum flake to solvent extraction with an organic solvent was not effective in preventing the premature collapse of the foam prior to the development of sufficient tensile strength in the foam to resist the gas pressure and other factors tending toward the collapse of the foam. Moreover, it was established that the several steps of successively washing the flakes with benzene, ether, and alcohol were ineffective in preventing the collapse of the polyurethane foam containing such washed aluminum flakes.

A satisfactory product was ultimately prepared when the aluminum flake was treated with an aqueous solution of phosphoric acid containing a small amount of a higher alkyl amine having surface active characteristics. The phosphoric acid, in combination with the alkyl amine type of surfactant, was effective in removing the active film on the aluminum flake. The surface of the aluminum was etched very slightly, as evidenced by the generation of hydrogen gas during the cleaning of the aluminum particles with the phosphoric acid composition. It is believed that a discontinuous film of aluminum phosphate is formed on the surface of at least some of the aluminum flakes, and that the bonding of the aluminum flake to the polyurethane foam is more secure by reason of the aluminum phosphate at the surface of the flake.

A sample of the insulation panel containing 1% metallic aluminum was prepared, incorporating the organic formulation herein described, and it was established that the insulation panel had an attractive silvery appearance and advantageous properties including the following:

Thermal conductivity, B.t.u./hr./sq.ft./°F./in. --- 0.151
Density, lbs./cu. ft. --- 2.029
Compression load, yield percent --- 9.3
Lbs./sq. in. compression load --- 38.4

This advantageous combination of low density, high compression strength and attractively low thermal conductivity indicates that the insulation panel would be useful as a welding shield. The transfer of heat by both radiation or conduction is effectively decreased by the use of such insulation panels.

*Example II*

An insulation panel was prepared using the formulation and technique of Example I, but incorporating 2% by weight of the phosphated aluminum flake. The panel had a density of 2.098 lbs./cu.ft., a compression load yeild percent of 9.1%, and a compression load yield of 35.9 lbs./sq.in. Of particular importance, the strong light silver colored polyurethane foam had a thermal conductivity of 0.143 B.t.u./hr./sq.ft./°F./in. The insulation panel was useful because the transfer of heat by both radiation or conduction was effectively decreased.

*Example III*

A sample of insulation panel containing 3% aluminum flake, but prepared in the same manner as the panel of Example II and was shown to have a thermal conductivity of 0.149 B.t.u./hr./sq.ft./°F./in., and the advantageous combination of a compression load of 33 lbs./sq.in., and a compression load yield of 9.3%. The effectiveness in decreasing radiation and absorption of heat, combined with the effectiveness in decreasing the conduction of heat, made the insulation panel useful as a welding shield and for other purposes.

*Example IV*

Trishydroxypropylglycerol may be prepared by the interaction of glycerol and three mols of propylene oxide thereby providing a reaction product having a hydroxyl number of about 630 and having a hydroxyl equivalent weight of 89. A suitable prepolymer may be prepared by reacting such trishydroxypropylglycerol with an excess of tolylene diisocyanate (570 g. TDI per 100 g. polyol) whereby unreacted —NCO groups constitute about 34% of the weight of the prepolymer. Such prepolymer has a viscosity of about 30 centistokes at 100° F. Marketed prepolymers have included a suitable prepolymer having a viscosity of about 30 centistokes at 100° F. and about 34% —NCO groups.

A resinous polyol having a viscosity of 4500 centistokes was prepared by the interaction of a large amount of epoxy propane and a small amount of glycerol. The product tris (hydroxypropylpolypropyleneether) glycerol, had a functionality of 3. A commercially available tris (hydroxypropylpolypropyleneether) glycerol is a polyol resin having a viscosity of 4500 centistokes.

A control sample of polyurethane foam was prepared by the interaction of the following formulation:

| | Parts by wt. |
|---|---|
| Prepolymer 34% —NCO | 200 |
| Tris (hydroxypropylpolypropyleneether) glycerol, 4500 centistokes | 150 |
| Water soluble silicone | 15 |
| Trichlorofluoromethane | 100 |
| Triethylenediamine | 6 |
| Stannous octoate | 0.1 |

The components of the formulation were thoroughly mixed by hand, and the batch was promptly poured into test molds, in which the composition underwent a foaming reaction to prepare a highly satisfactory polyurethane foam product.

Several silver-colored foams having excellent reflective characteristics were prepared by incorporating phosphatized aluminum flake in said polyurethane formulation. In this series, it was noted that ratios of polyurethane to aluminum as high as 14.7/1 were too low to achieve low conductivity of the product. By such series of preparations, it is established that the concentration of aluminum should not be greater than 5%. Possibly there are possibilities for some conduction of heat from aluminum flake to aluminum flake when the aluminum flake concentration exceeds 5%. Each insulation panel employed phosphatized aluminum flake prepared by treating commercially available aluminum flake for several minutes with an aqueous solution containing about 10% phosphoric acid. The K factors of certain compositions are shown as follows:

| Polyurethane/Al Weight Ratio | Percent Al in Product | K Factor |
|---|---|---|
| 33.5 | 2.9 | 0.145 |
| 24.0 | 4.0 | 0.135 |
| 19.4 | 4.9 | 0.130 |
| 14.9 | 6.3 | 0.28 |
| 10.0 | 9.1 | 0.27 |
| 6.7 | 13.0 | 0.28 |

The superiority of the polyurethane insulation panels containing 0.1 to 5% by weight of phosphatized aluminum flake was further established by a series of tests showing that commercially available aluminum flake, untreated or treated by conventional procedures, promoted the collapse of the foams, resulting in high density products with K factors outside the range of insulation panel K factors.

Obviously, many modifications and variations of the invention as hereinbefore set forth may be made without departing from the spirit and scope thereof, and therefore only such limitations should be imposed as are indicated in the appended claims.

The invention claimed is:

1. The method of preparing reflective insulation which includes the steps of: dispersing in at least one of the group of tolylene diisocyanate and a polyol selected from the group consisting of polyetherpolyols resulting from the interaction of propylene oxide and methyl glucoside and polyetherpolyols resulting from the interaction of propylene oxide and glycerol, a quantity of phosphatized aluminum flake corresponding to from 0.5 to 5% by weight, said aluminum flake previously having been treated with an aqueous solution of phosphoric acid to prepare phosphatized aluminum flake; bringing about the interaction of the tolylene diisocyanate and polyetherpolyol in the presence of a minor amount of trichlorofluoromethane under conditions favoring the formation of polyurethane foam, said conditions volatizing trichlorofluoromethane to form pores in such foam; and curing the reaction product to provide reflective insulation containing from 0.5 to 5% by weight of phosphatized aluminum flake dispersed in polyurethane foam.

2. The method of preparing reflective insulation in accordance with claim 1 in which the aluminum flake is treated with an aqueous solution of phosphoric acid containing a surfactant.

3. Reflective insulation consisting predominantly of the reaction product of tolylene diisocyanate and a polyol selected from the group consisting of polyetherpolyols resulting from the interaction of propylene oxide and methyl glucoside and polyetherpolyols resulting from the interaction of propylene oxide and glycerol most of the volume of the reflective insulation being pores resulting from the vapors of trichlorofluoromethane and said reflective insulation containing from 0.5 to 5% by weight of phosphatized aluminum flake prepared by treatment of aluminum flake with phosphoric acid.

References Cited by the Examiner

UNITED STATES PATENTS

| | | | |
|---|---|---|---|
| 2,577,280 | 12/1951 | Simon et al. | 260—2.5 |
| 3,072,582 | 1/1963 | Frost | 260—2.5 |
| 3,079,349 | 2/1963 | Weyer | 260—2.5 |

LEON J. BERCOVITZ, *Primary Examiner.*

DONALD E. CZAJA, *Examiner.*